(No Model.)

C. L. THOMAS.
VEHICLE SPRING.

No. 374,095. Patented Nov. 29, 1887.

WITNESSES
B. Frigitt
Mo. B. Harris

INVENTOR
Charles L. Thomas
by E. W. Anderson
his Attorney

UNITED STATES PATENT OFFICE.

CHARLES L. THOMAS, OF JANESVILLE, WISCONSIN.

VEHICLE-SPRING.

SPECIFICATION forming part of Letters Patent No. 374,095, dated November 29, 1887.

Application filed March 9, 1887. Serial No. 230,266. (No model.)

*To all whom it may concern:*

Be it known that I, CHARLES L. THOMAS, a citizen of the United States, and a resident of Janesville, in the county of Rock and State of Wisconsin, have invented certain new and useful Improvements in Vehicle-Springs; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
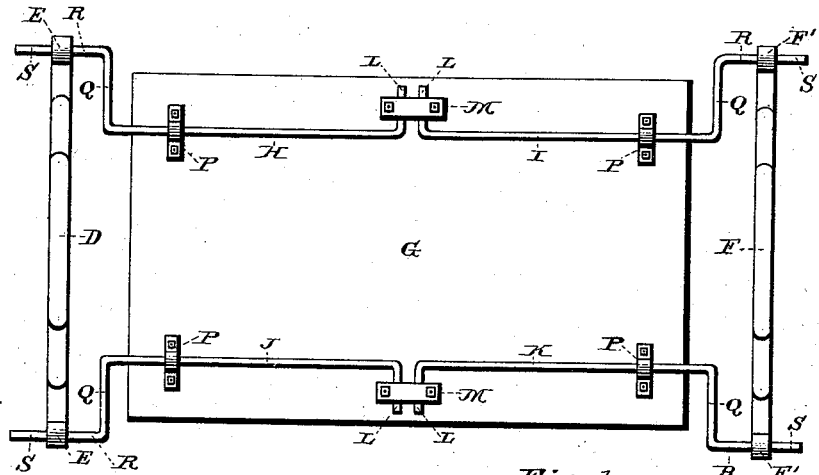
Figure 2:
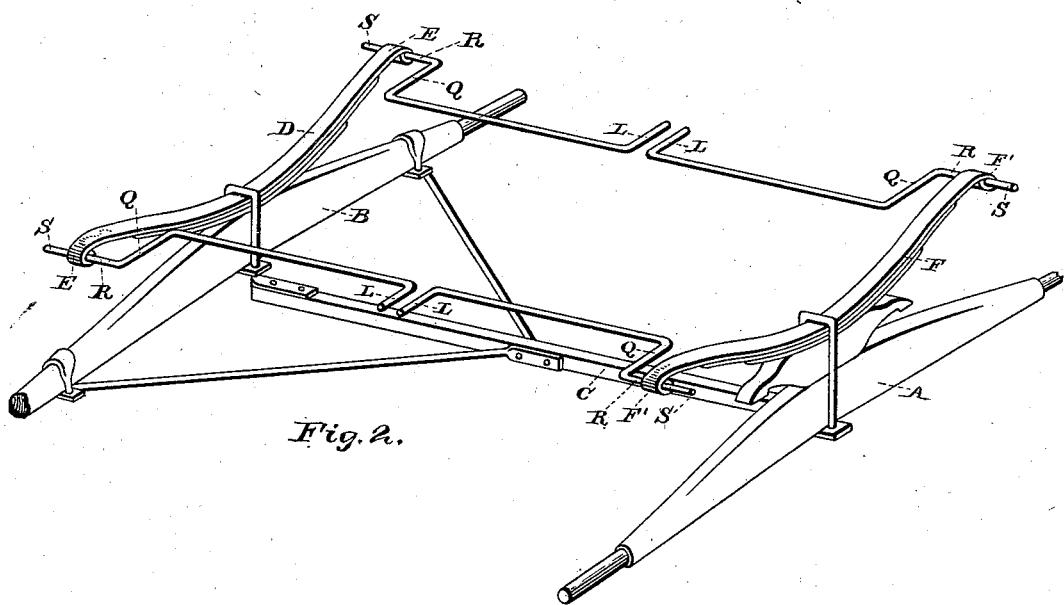

Figure 1 of the drawings is a bottom view of a vehicle-body with my improved springs attached. Fig. 2 is a perspective showing my improved springs attached to the running-gear of a vehicle.

My invention relates to vehicle springs; and it consists in the construction and novel combination of parts, as hereinafter described and claimed.

Referring by letter to the accompanying drawings, A designates the front axle, B the rear axle, and C the reach, of the running-gear of a vehicle, which is sufficient to illustrate the application of my improvement thereto.

D designates a half-elliptical spring, which is concave, and is provided at its ends with eyes E. The spring D is secured to the rear axle in the manner commonly practiced.

F designates the front spring, which is also half-elliptic, and is provided with eyes F' at its ends, and is secured to the head-block of the running-gear in the usual manner.

G is the vehicle body, the length of which is considerably less than the distance between the front spring, F, and the rear spring, D.

H I and J K are torsion-rods, angularly bent in the same plane, or nearly so, the inner ends of which are provided with outwardly-bent arms L, which arms L are secured to the lower face of the vehicle-body G by clips M, two clips M being required to secure the four arms L to the body, the inner ends of the torsion-rods being brought near together to permit two clips only to be used. The torsion portions of these rods extend beyond the ends of the vehicle-body, as shown. Near the front and rear ends of the bottom of the body, on the lower face of the same, half-boxes P P P P are provided for the torsion-rods H I J K to turn in. Near their outer ends the torsion-rods are bent first outwardly at Q, and then rearwardly at R, or forwardly for the front rods, and the ends S are seated in the eyes of the springs F D. By this arrangement of the half-elliptic springs and the torsion-rods I get the action of both in unison, which gives an easy-riding vehicle.

Having described my invention, what I claim, and desire to secure by Letters Patent, is—

The combination, with the running-gear and short bed or body of a vehicle, of the rear half-elliptic spring having eyes at its ends, and the front half-elliptic spring having eyes at its ends, of the angularly-bent torsion-rods extending beyond the ends of the body, having their outer ends seated in the eyes of the half-elliptic springs, their inner ends secured to the body by clips, and the boxes secured to the body near the end bends of the torsion-rods, substantially as specified.

In testimony whereof I affix my signature in presence of two witnesses.

CHARLES L. THOMAS.

Witnesses:
J. HARRY ROGERS,
EDWIN F. CARPENTER.